US006966030B2

(12) United States Patent
Ashford et al.

(10) Patent No.: US 6,966,030 B2
(45) Date of Patent: Nov. 15, 2005

(54) METHOD, SYSTEM AND COMPUTER PROGRAM PRODUCT FOR IMPLEMENTING ACRONYM ASSISTANCE

(75) Inventors: Thomas Jay Ashford, Austin, TX (US); Cary Lee Bates, Rochester, MN (US); Brian John Cragun, Rochester, MN (US); Paul Reuben Day, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 679 days.

(21) Appl. No.: 09/908,417

(22) Filed: Jul. 18, 2001

(65) Prior Publication Data

US 2003/0018670 A1   Jan. 23, 2003

(51) Int. Cl.[7] .............................................. G06F 17/21
(52) U.S. Cl. ..................... 715/532; 715/531; 715/534; 704/251
(58) Field of Search ............................. 715/530, 532, 715/531, 534; 707/3; 704/251

(56) References Cited

U.S. PATENT DOCUMENTS

| | | | | |
|---|---|---|---|---|
| 5,469,355 A | * | 11/1995 | Tsuzuki | 704/9 |
| 5,551,049 A | * | 8/1996 | Kaplan et al. | 715/532 |
| 5,819,260 A | * | 10/1998 | Lu et al. | 707/3 |
| 6,493,693 B1 | * | 12/2002 | Hill | 706/46 |
| 6,732,120 B1 | * | 5/2004 | Du | 707/104.1 |

* cited by examiner

*Primary Examiner*—Stephen Hong
*Assistant Examiner*—Matthew Ludwig
(74) *Attorney, Agent, or Firm*—Joan Pennington

(57) ABSTRACT

A method, system and computer program product are provided for implementing acronym assistance for a user of a text editor or browser program. An acronym in a text document is identified. Then the text document is scanned to identify a definition of the acronym. Responsive to identifying the definition of the acronym, the definition of the acronym is displayed to the user. Acronym assistance is provided for a reader and a writer using the text program. Both an acronym dictionary and an acronym collection file can be used to identify the definition of the acronym. User selected options are provided for displaying the definition of the acronym to the user. For a writer using the text program, the definition of the acronym can be provided in-line in the document text. A footnote definition of the acronym can be provided with a reference to an original acronym definition.

17 Claims, 18 Drawing Sheets

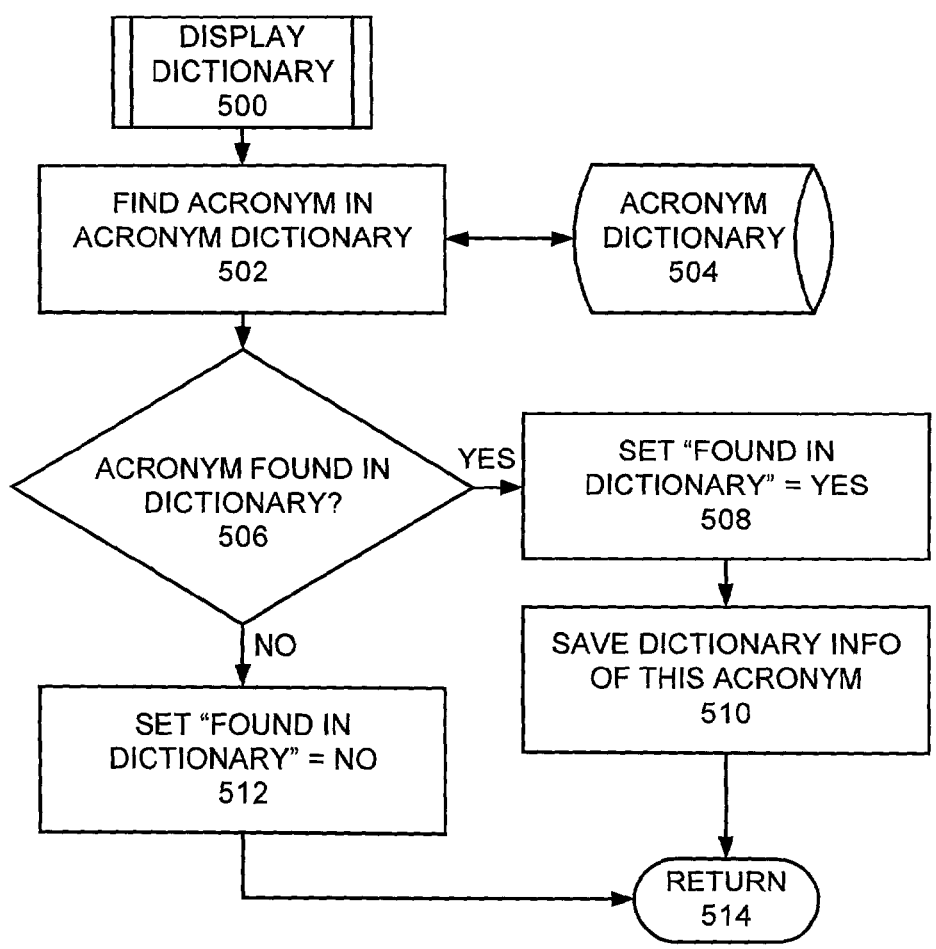

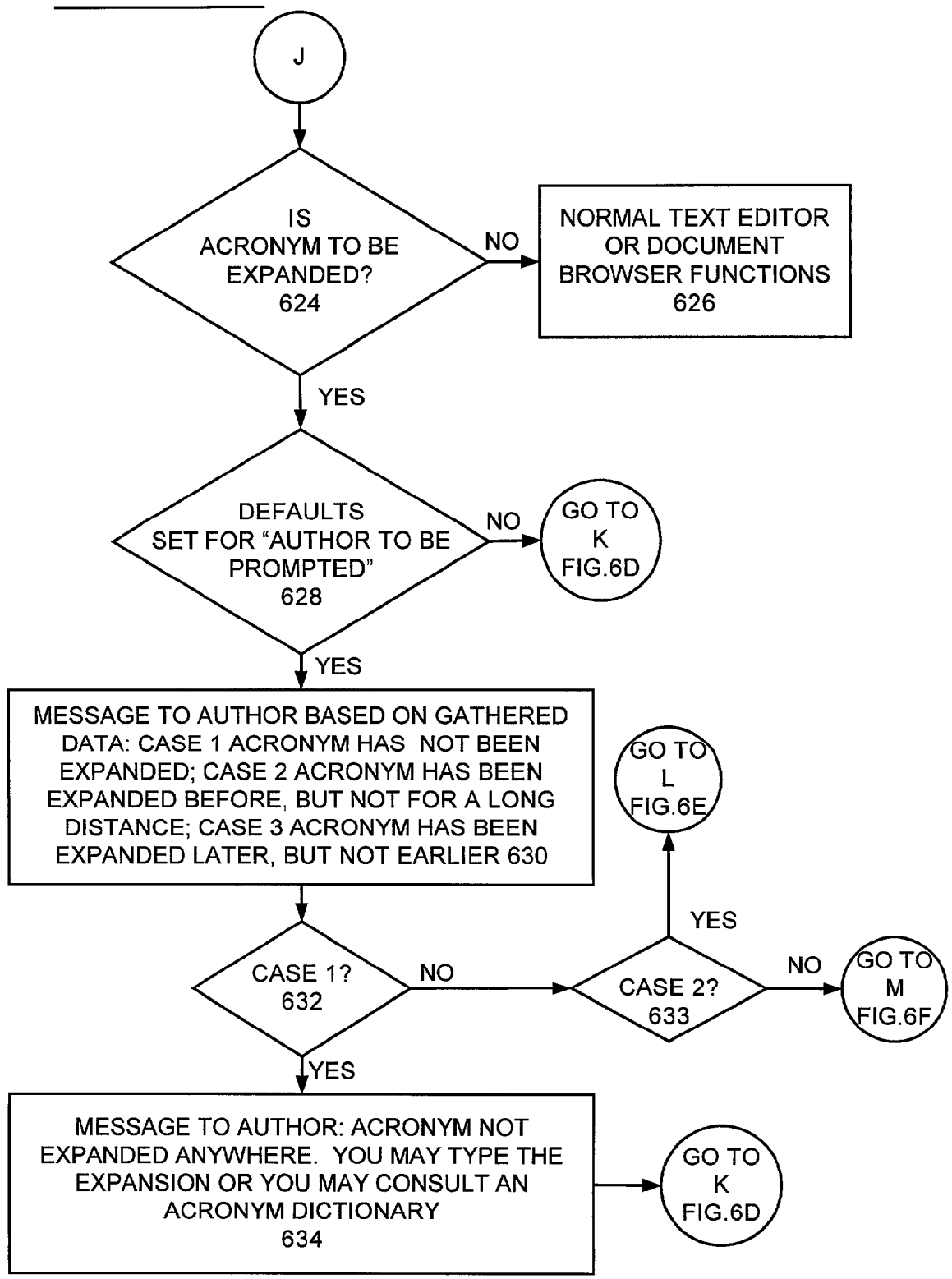

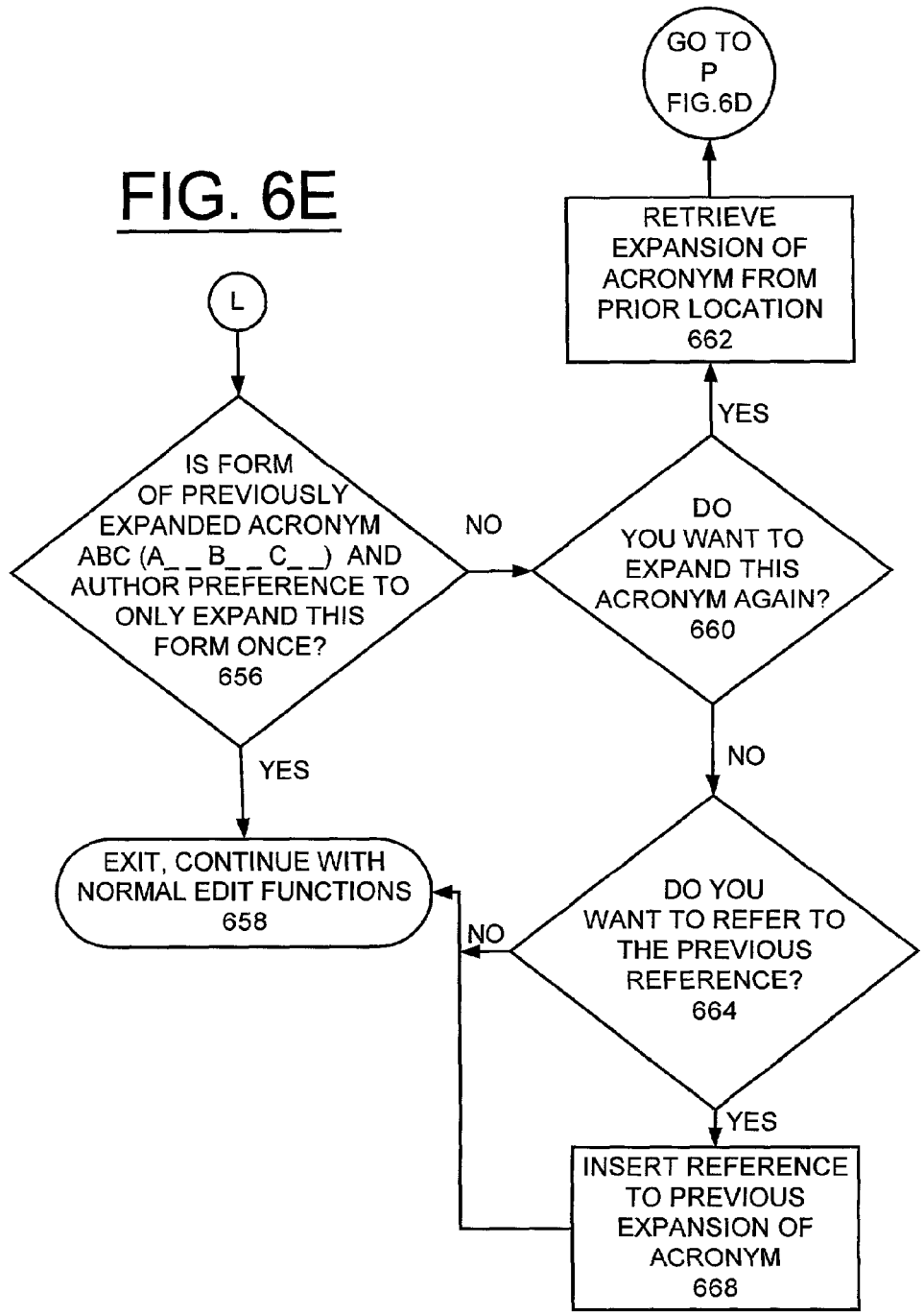

METHOD, SYSTEM AND COMPUTER PROGRAM PRODUCT FOR IMPLEMENTING ACRONYM ASSISTANCE

FIELD OF THE INVENTION

The present invention relates generally to the data processing field, and more particularly, relates to a method, system and computer program product for implementing acronym assistance for a user of a text editor program, browser, word processor, or any program that displays or manages text.

DESCRIPTION OF THE RELATED ART

Many people when reading a document come across an acronym and wonder what it means, then spend several minutes scanning back to find its first occurrence where it is defined. This is labor intensive and frustrating; and even more so when the acronym definition is not provided but should have been.

The problem is even greater on the world wide web where often the reader enters a page within the middle of someone's web site, because that is the page the search engine found, and the reader has not read the other pages.

One challenge writers face when composing a document or text is to correctly use and define acronyms. Current word processing programs allow writers to check spelling mistakes and the grammar of the passage.

A need exists for a technique for implementing acronym assistance. It is desirable to provide a technique for implementing acronym assistance to assist a reader and to assist a writer using a text program. As used in the following description and claims, it should be understood that examples of text program include an electronic book, a text editor program, a browser, a word processor, such as, Microsoft Word, Corel Word Perfect, and Star Office, or any program that displays or manages text.

SUMMARY OF THE INVENTION

A principal object of the present invention is to provide a method, system and computer program product for implementing acronym assistance for a user of a text program. Other important objects of the present invention are to provide such method, system and computer program product for implementing acronym assistance substantially without negative effect and that overcome many of the disadvantages of prior art arrangements.

In brief, a method, system and computer program product are provided for implementing acronym assistance for a user of a text program. An acronym in a text document is identified. Then the text document is scanned to identify a definition of the acronym. Responsive to identifying the definition of the acronym, the definition of the acronym is displayed to the user.

In accordance with features of the invention, acronym assistance is provided for a reader and a writer using the text program. Both an acronym dictionary and an acronym collection file can be used to identify the definition of the acronym. User selected options are provided for displaying the definition of the acronym to the user. For a writer using the text program, the definition of the acronym can be provided in-line in the document text. A footnote definition of the acronym can be provided with a reference to an original acronym definition.

BRIEF DESCRIPTION OF THE DRAWINGS

The present invention together with the above and other objects and advantages may best be understood from the following detailed description of the preferred embodiments of the invention illustrated in the drawings, wherein:

FIGS. 2A, 2B, 2C, 2D, 2E, 3A, 3B, 4, 5, 6A, 6B, 6C, 6D, 6E and 6F are flow charts illustrating exemplary steps for implementing acronym assistance in accordance with the preferred embodiment.

DETAILED DESCRIPTION OF THE PREFERRED EMBODIMENTS

Figure 1A:
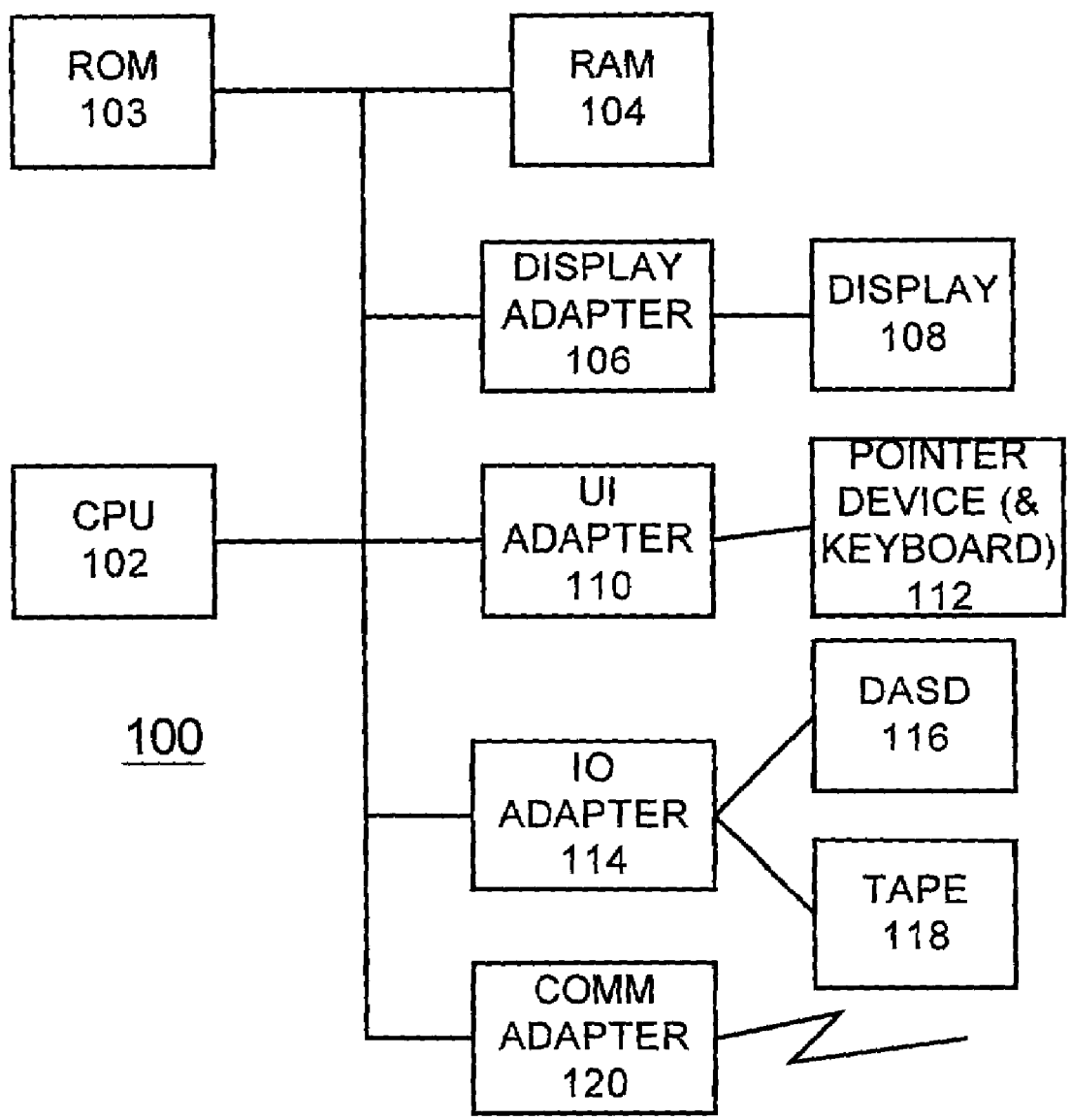
FIGS. 1A and 1B are block diagram representations illustrating a computer system and operating system for implementing acronym assistance in accordance with the preferred embodiment.
Figure 1B:
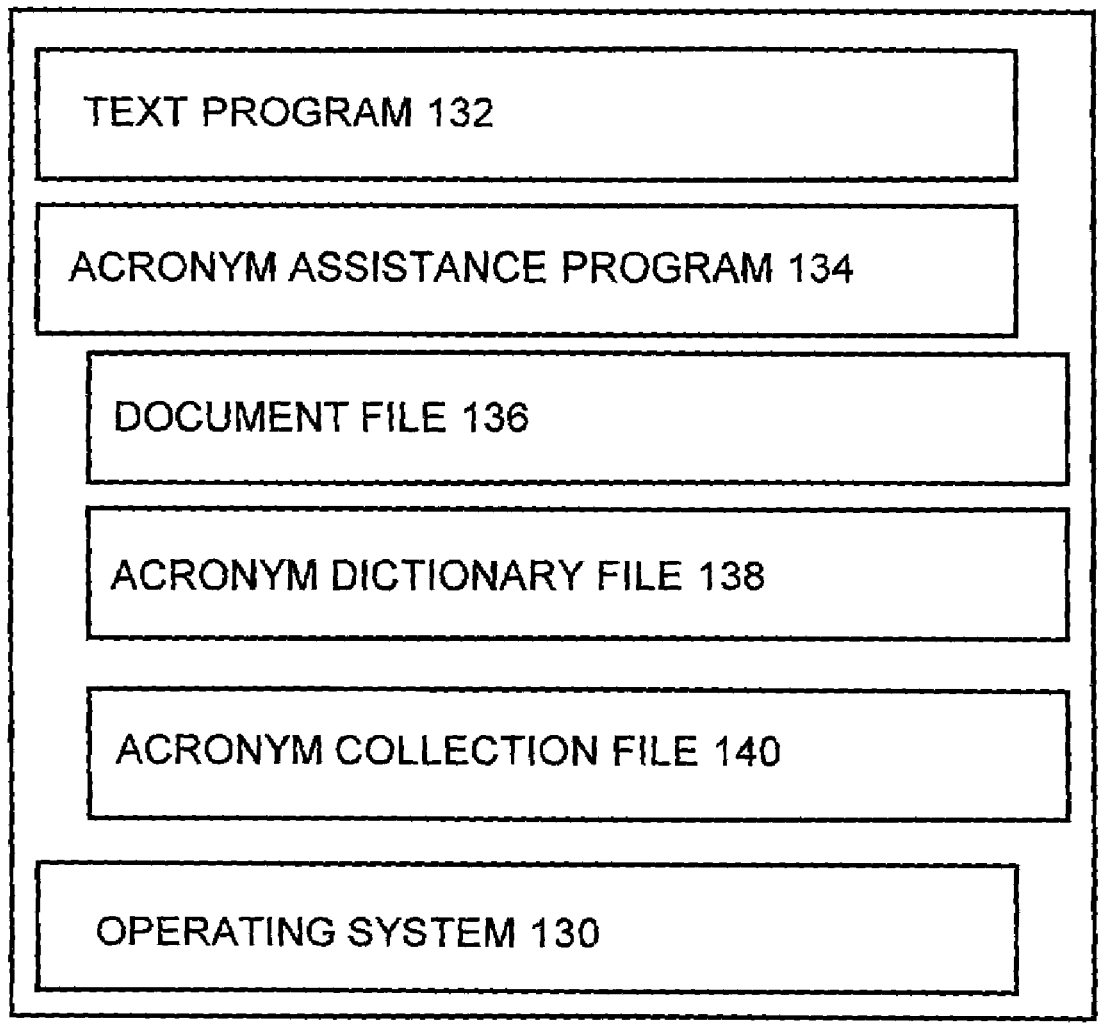

Having reference now to the drawings, in FIGS. 1A and 1B, there is shown a computer or data processing system generally designated by the reference character 100 for carrying out the acronym assistance methods of the preferred embodiment. As shown in FIG. 1A, computer system 100 includes a central processor unit (CPU) 102, a read only memory 103, a random access memory 104, a display adapter 106 coupled to a display 108. CPU 102 is connected to a user interface (UI) adapter 110 connected to a pointer device and keyboard 112. CPU 102 is connected to an input/output (IO) adapter 114 connected to a direct access storage device (DASD) 116 and a tape unit 118. CPU 102 is connected to a communications adapter 120 providing a communications function. It should be understood that the present invention is not limited to a computer model with a single CPU, or other single component architectures as shown in FIG. 1A.

As shown in FIG. 1B, computer system 100 includes an operating system 130, a text program 132 and an acronym assistance program 134 of the preferred embodiment. A document file 136, an acronym dictionary file 138 and an acronym collection file 140 are stored in accordance with the acronym assistance methods of the preferred embodiment. The text program 132 includes various computer programs that display and process text, such as browsers and word processors.

Various commercially available computers can be used for computer system 100; for example, an IBM personal computer. CPU 102 is suitably programmed by the acronym assistance program 134 to execute the flowcharts of FIGS. 2A, 2B, 2C, 2D, 2E, 3A, 3B, 4, 5, 6A, 6B, 6C, 6D, 6E and 6F.

In accordance with features of the preferred embodiment, reading assistance is provided for the user of the text program 132 browsers and word processors, and any other computer program that displays and processes text. The user can select an acronym and click for acronym help. The acronym assistance program 134 scans back in the document, and in some cases scans forward in the document, and attempts to find the definition of the acronym. This scanning looks for the acronym defined in the source in one of several known forms, or in the case of a HyperText Markup Language (HTML) document may also look for a meta tag or other tag that is inserted simply to define the acronym. In addition, composition assistance is provided for the user of text program 132. During document composition, the acronym assistance program 134 reminds the author when an acronym is not defined internally on the first use of the acronym. Grouped documents also are consulted such as for chapters in a book.

In accordance with features of the acronym collection file 140 of the preferred embodiment, once an acronym expansion has been saved and an occurrence of the acronym is found, the acronym assistance program 134 provides the following options for the user to select: Display the acronym definition in bubble text; and take the user to that part of the document where the acronym is defined. If the user takes this option, an icon will be presented next to this text that if the user clicks will take the user back to the interrupted reading point. In an HTML environment, the system can automatically insert or turn the acronym into an internal hypertext link, with a unique icon, that will take the user to the internally documented acronym definition. This link may or may not actually be put into the document, but would be rendered by the acronym assistance program 134 when displaying the acronym in this acronym mode. Provision is made to expand the support for a collection of documents that are related. For example, the chapters in a book are bound together into a unit, but each chapter is a separate document. The assistance will allow the user to move into the correlated documents and treat them as a whole. In an HTML environment, the correlation may be based on the current navigational list, or upon all documents linked from a parent document. Multiple modes of operation are provided to support readers who are more or less familiar with the material. Readers who are more familiar with the acronyms can see the definitions in bubble text at user request. For the convenience of those less familiar, the acronyms can be automatically displayed in expanded form within the text stream; for example, if the original text was simply DNR, it could be automatically displayed as DNR (Department of Natural Resources).

In accordance with features of the preferred embodiment, if the acronym assistance program 134 does not find the definition of the acronym within the document or group of documents, reading assistance will have the option to provide display of the acronym(s) from the independent acronym dictionary file 138, or an independent collection of usages of the acronym collection file 140 with accompanying contexts. The user can then view the definitions from the dictionary via bubble text, or can jump to the dictionary to view the definitions and contexts there, and then easily get back to the interrupted reading point.

In accordance with features of the preferred embodiment, acronym assistance composition help is provided for the user by the acronym assistance program 134. Sometimes an author may provide an acronym definition in chapter 1, and then during a re-write move chapter 1 behind a later chapter, and then the reader becomes confused when encountering the acronym earlier in the document before it is defined. The composition help will check for correct definition placements when chapters are bound or rebound, so that they occur on first usage.

The composition help of the acronym assistance program 134 can spell out, or recommend, the long form of the acronym at opportune points other than first occurrence during formatting of the document. For example, at the beginning of a new chapter, an acronym expansion can facilitate easier reading when chapters are long or it is expected that readers may read the chapters disjointly. Another example is if there is extra space on the page or paragraph and the expansion will not cause extra wrapping, and the expansion has not occurred for a while; then the acronym is expanded.

The composition help of the acronym assistance program 134 can provide an automatic option for a footnote expansion of the acronym instead of an inline acronym expansion. The footnote option can also include a reference to the page number of the original acronym definition.

In composition assistance, the format of the acronym definition can be used by the acronym assistance program 134 as a rule to imply reader knowledge. For example, if the acronym is initially defined by the author in the format of ABC (A—B—C) when the acronym is expanded by the author immediately after the acronym, then the rule is that the intended reader is probably familiar with ABC and the expansion is just a reminder. On the other hand, if the initial format is A—B—C—(ABC) then the rule is that the reader is probably not familiar with ABC. Then the composition help of the acronym assistance program 134 will use this rule in placement of footnotes or subsequent expansion of the acronym at new chapters, and the like. The author would be expected to be aware of this rule to get the expected results, and an option also could invert the expectation of the expansion order at the author preference.

If the author is using an acronym but does not know its original expansion, an option of the composition assistance of the acronym assistance program 134 enables the author to consult an acronym dictionary for a selection which the author can insert into his or her document. For example, the author can type HTML and the acronym assistance program 134 will provide a prompt: Do you want to add a parenthetical explanation that HTML stands for HyperText Markup Language?

The composition assistance also provides recommendations about the advisability of including the definition in your document. Some acronyms are so pervasive that you should assume everyone knows them. For example, the acronym assistance program 134 can advise that the acronym IBM is not worth expanding. For acronyms not worth expanding the automatic options will not trigger, but the author can still override this determination on a case-by-case basis.

Figure 2A:
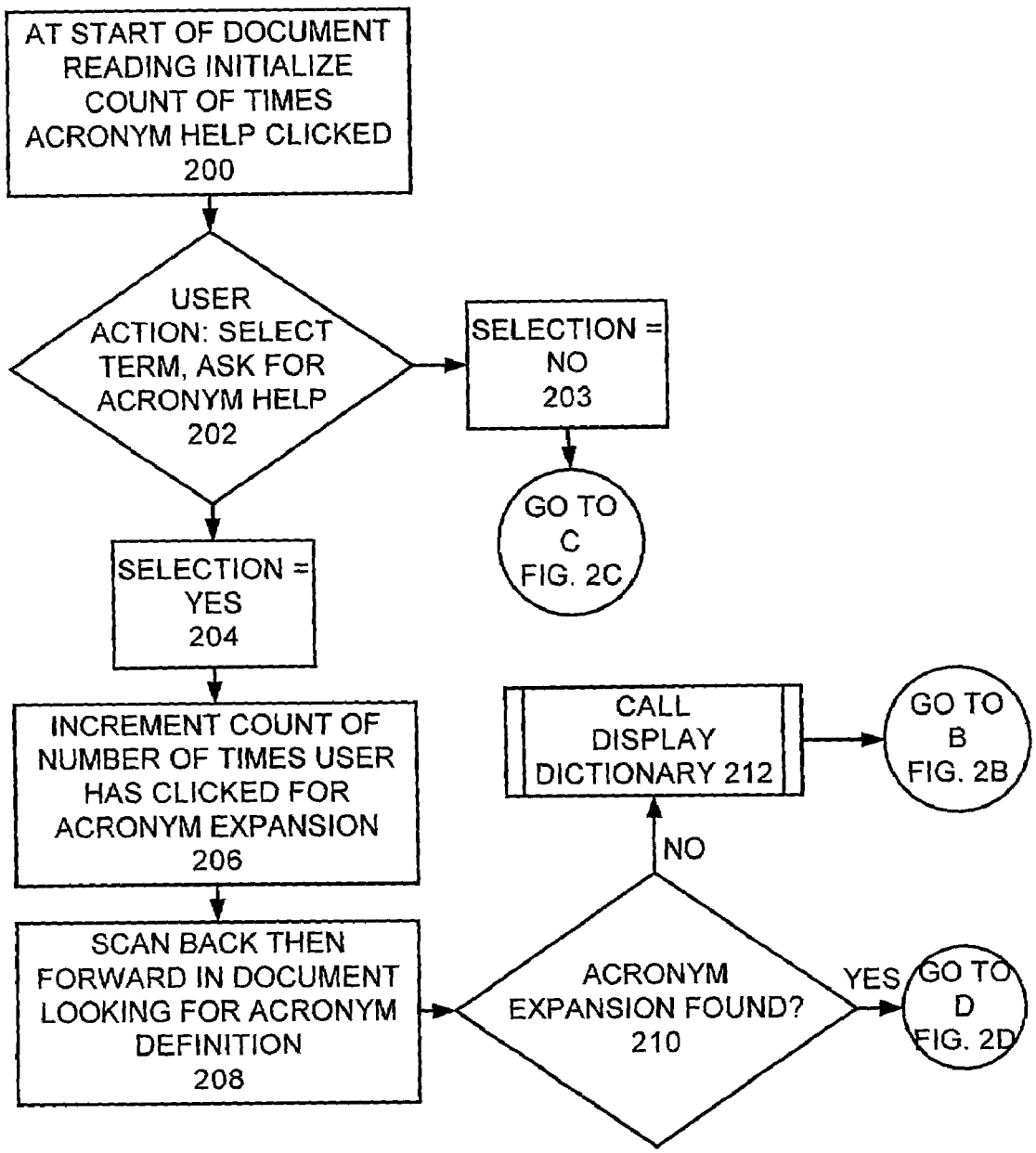

Referring now to FIG. 2A, there are shown exemplary steps for implementing acronym reading assistance in accordance with the preferred embodiment. At start of document reading, a count of the number of times acronym help has been clicked is initialized as indicated in a block 200. Checking for user action of 'select term, ask for acronym help' is performed as indicated in a decision block 202. When this action is not selected as indicated in a block 203, the sequential steps continue following entry point C in FIG. 2C. When a selection of yes is identified as indicated in a block 204, the count of the number of times acronym help or expansion has been clicked is incremented as indicated in a block 206. Next, scanning back then forward in the document looking for the acronym definition is performed as indicated in a block 208.

For example, if looking for the definition of the acronym DNR, scanning back then forward in the document text looking for the acronym definition for DNR is performed at block 208. In this step at block 208, the scanning phase first finds DNR in all uppercase and then looks each direction to see if it can find words that start with the same characters, or words that may have one of the characters in the middle of the word uppercased. For example, on either side of DNR, scanning for the capital letters D, N, R in contiguous words, such as DNR (Department of Natural Resources) or Department of Natural Resources (DNR). The scanning sequence at block 208 also is smart enough to ignore certain words, such as, of and the, and make an allowance to selectively ignore a word that is not uppercased.

In addition to scanning the document text for the acronym definition, scanning for tag format that explicitly identifies an acronym also is performed at block 208. For example, the tag format may be of the form:

<ACRONYM>MADD Mothers Against Drunk Driving </ACRONYM>

This tag simply defines the acronym and is not displayed on the page unless the user invokes the acronym assistance.

In addition to scanning the document text for the acronym definition and the tag format, scanning on HTML linked pages for the acronym definition also is performed at block 208. For example, the tag for other pages to look for acronyms is represented by:

<ACRONYMPAGES>url1,url2,url3</ACRONYMPAGES>

This tells the browser to look on these other Universal Resource Locators (URLs) for definitions of acronyms that appear on this page.

Heuristics also are used to find the acronym meaning at block 208. Words within N+5 words either side of the first acronym in the document set are analyzed, where N is the number of characters in the acronym. First characters of the words are searched for an order that matches the pattern of the acronym. Common words, such as, of, are discounted. Near matches are allowed to use interior word characters to fill in missing letters. Capital letters are given priority; for example, if the acronym spells out a real word, such as STING, all capitals implies that this is an acronym. Also, usage of the acronym as a noun further implies that it is an acronym. Search goes initially to the front of the document, then to any section within the word Glossary or Dictionary in the document, then to other places in the document.

Figure 2B:
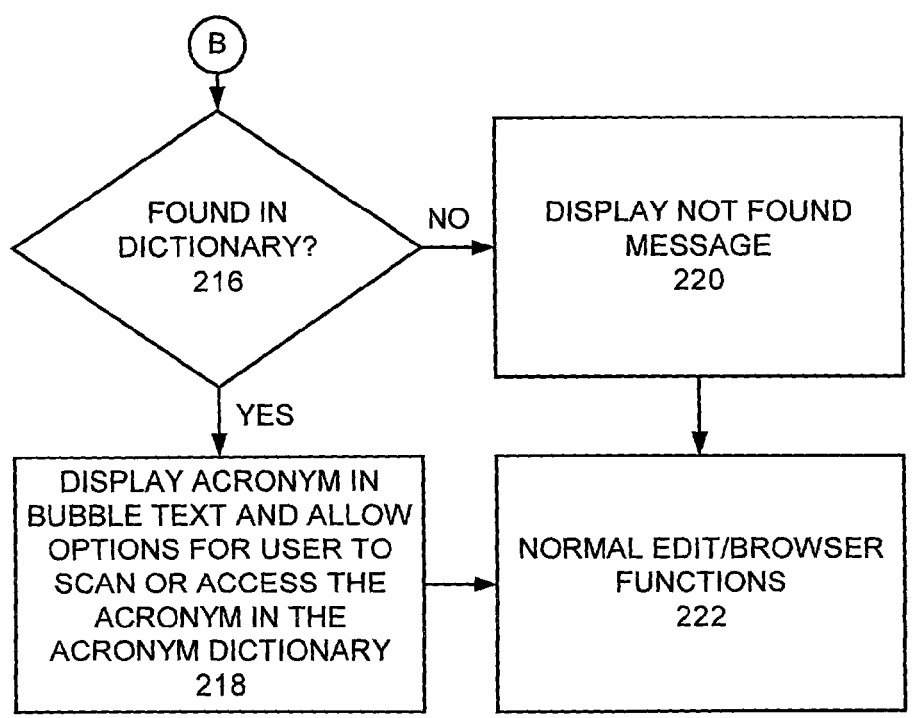
Figure 2C:
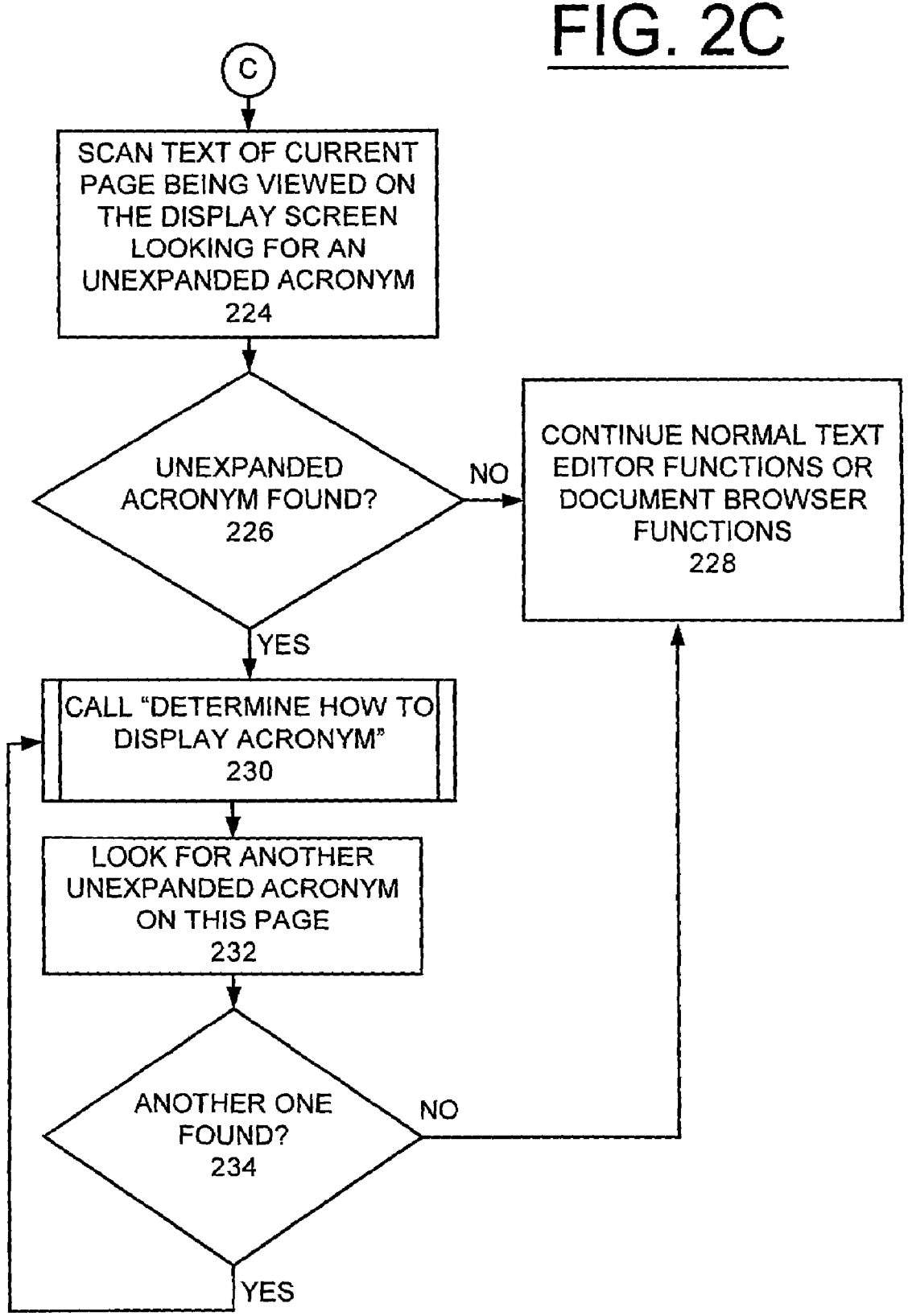
Figure 2D:
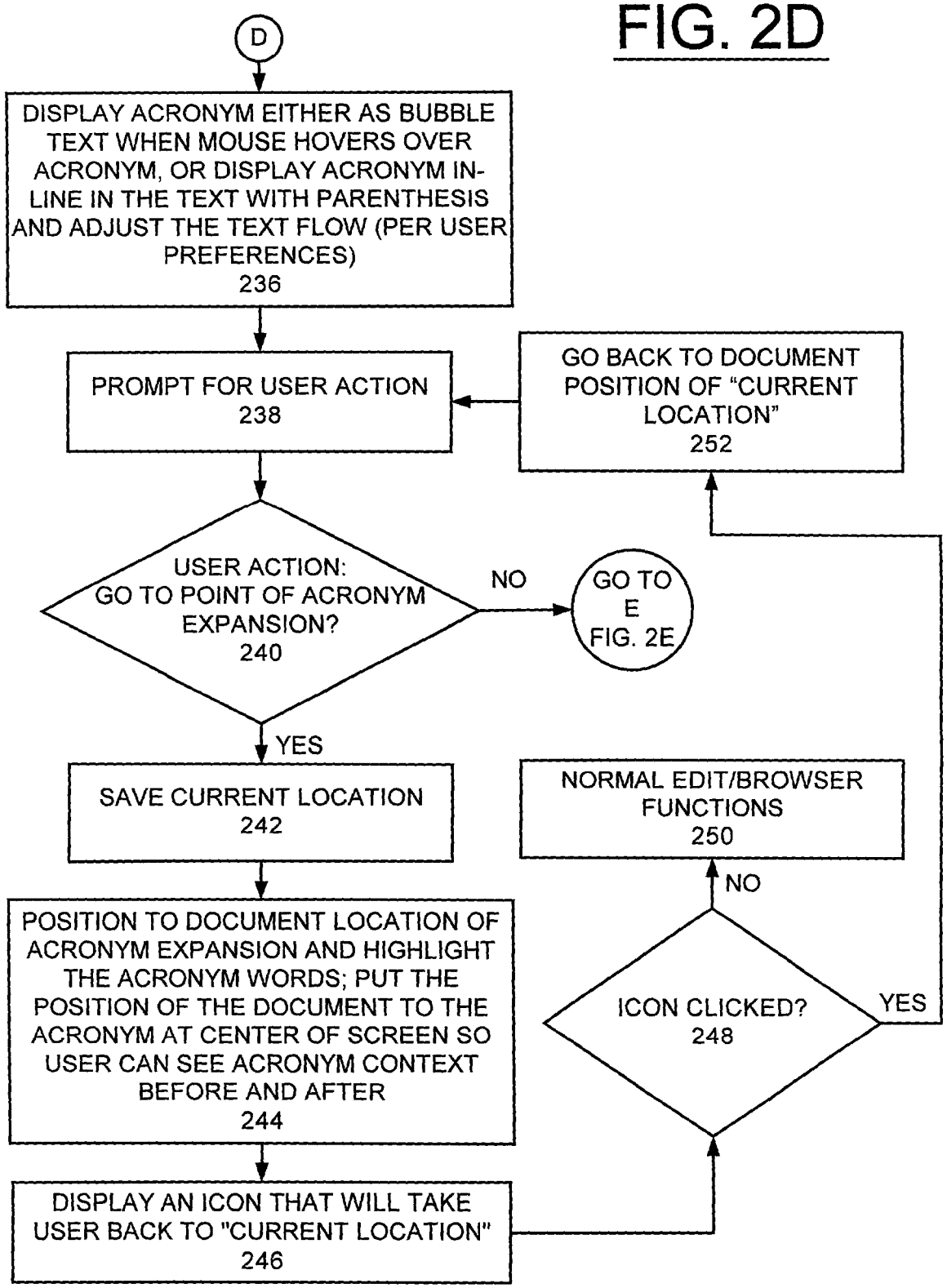

Once the scanner finds a match as indicated in a decision block 210, then the sequential steps continue following entry point D in FIG. 2D, where the acronym is saved. When the acronym expansion is not found at decision block 210, then a display dictionary routine is called as indicated in a block 212. The display dictionary routine is illustrated and described with respect to FIG. 5. Then the sequential steps continue following entry point B in FIG. 2B.

Referring now to FIG. 2B following entry point B after the display dictionary routine is called at block 212 in FIG. 2A, checking whether the acronym expansion is found in the dictionary is performed as indicated in a decision block 216. When the acronym expansion is found in the dictionary, the acronym is displayed in bubble text and options are enabled for the user to scan or access the acronym in the acronym dictionary as indicated in a block 218. Otherwise, when the acronym expansion is not found in the dictionary; a not found message is displayed as indicated in a block 220. For example, the message: "Sorry, acronym not found in this document or in dictionary" is displayed at block 220. Normal edit/browse functions are performed as indicated in a block 222.

Referring now to FIG. 2C following entry point C after a selection of no is identified at block 203 when the user did not click on acronym help in FIG. 2A, the text of the current page being viewed on the display screen is scanned, looking for an unexpanded acronym as indicated in a block 224. Checking whether an unexpanded acronym is found is performed as indicated in a decision block 226. When an unexpanded acronym is not found, then normal text editor functions or document browse functions are continued as indicated in a block 228. When an unexpanded acronym is found, then a routine to determine how to display acronym is called as indicated in a block 230. The routine to determine how to display acronym is illustrated and described with respect to FIG. 3A. Scanning and looking for another unexpanded acronym on this page is performed as indicated in a block 232. Checking whether another unexpanded acronym is found is performed as indicated in a decision block 234. When an unexpanded acronym is not found, then normal text editor functions or document browse functions are continued at block 228. When another unexpanded acronym is found, then the routine to determine how to display acronym is called at block 230 and the sequential steps continue.

Referring now to FIG. 2D following entry point D after an acronym expansion is found at decision block 210 in FIG. 2A, the acronym is displayed either as bubble text or the acronym is displayed in-line in the text with parenthesis and the text flow is adjusted per user preferences as indicated in a block 236. The user is prompted for user action as indicated in a block 238. Checking for a user action to go to point of acronym expansion is performed as indicated in a block 240. When a user action to go to point of acronym expansion is not identified, the sequential operations continue following entry point E in FIG. 2D. When a user action to go to point of acronym expansion is identified, the current location is saved as indicated in a block 242. Positioning to the document location of acronym expansion and highlighting the acronym words is performed, for example, to put the position of the document to the acronym at center of screen so user can see acronym content before and after as indicated in a block 244. An icon that will take the user back to the current location is displayed as indicated in a block 246. Checking whether the displayed icon is clicked is performed as indicated in a decision block 248. When the displayed icon is not clicked, normal edit and browser functions are continued as indicated in a block 250. When the displayed icon is clicked, the document position of current location is provided as indicated in a block 252. Then the user is prompted for user action at block 238.

Figure 2E:
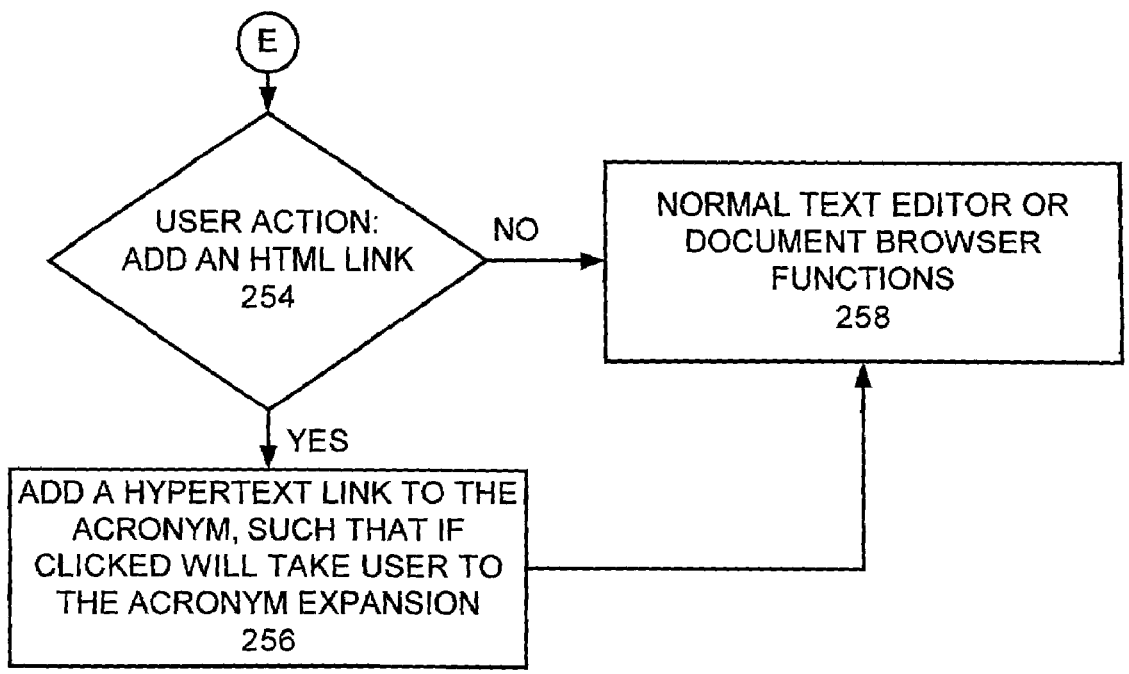

Referring now to FIG. 2E following entry point E after a user action to go to point of acronym expansion is not identified, checking for a user action to add an HTML link is performed as indicated in a decision block 254. When a user action to add an HTML link is identified, a hypertext link is added to the acronym, such that if clicked, the HTML link takes the user to the acronym expansion as indicated in a block 256. Because this is reading assistance rather than document composition, this HTML link may be rendered internally only during the display of the document. The option to add an HTML link for reading assistance would typically be a generic option or default taken once at document entry to apply to all acronyms in the document. After an internal HTML link is or is not added, normal text editor or document browser functions are continued as indicated in a block 258.

Figure 3A:
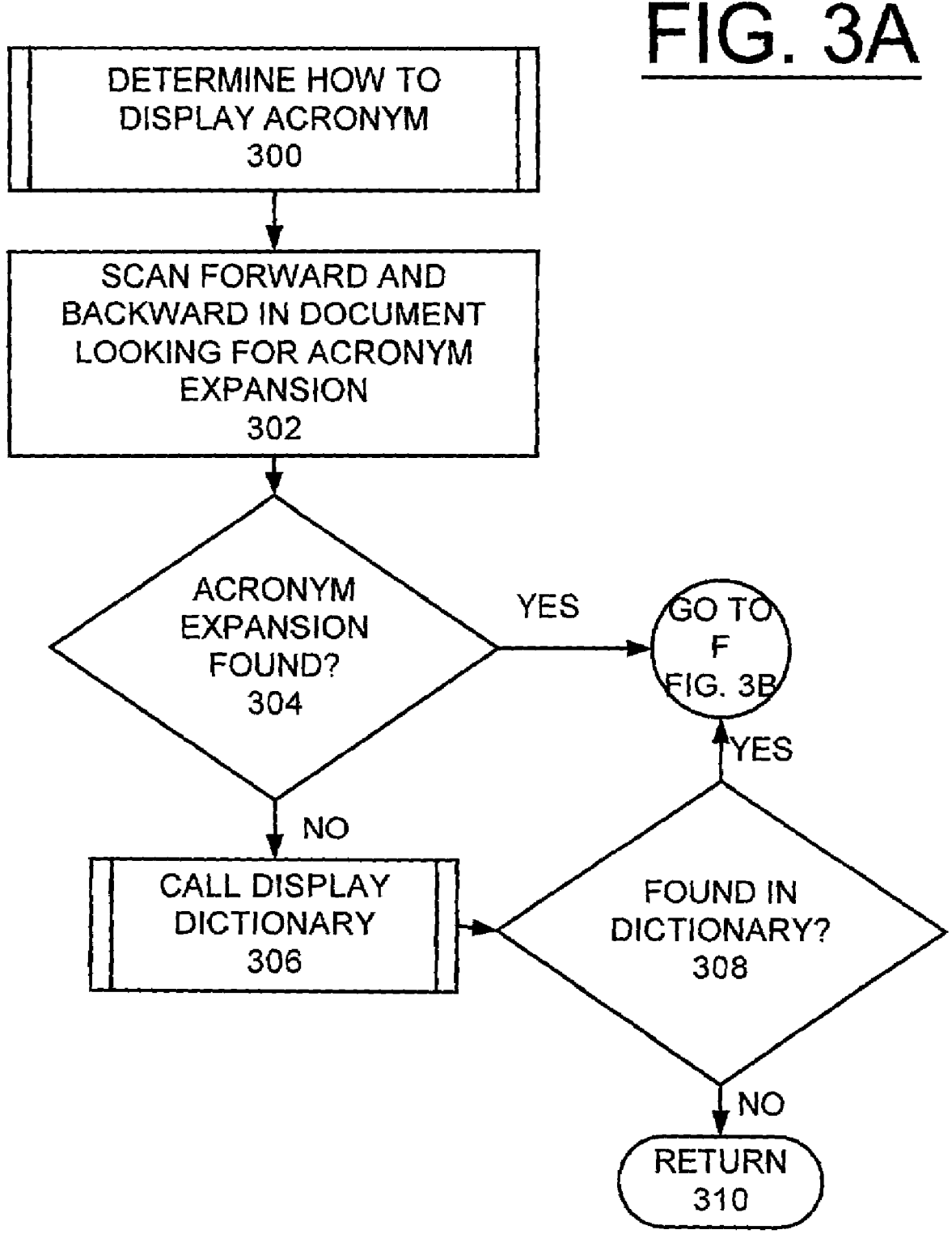

Referring now to FIG. 3A that is called at block 230 in FIG. 2C, there are shown exemplary sequential steps to determine how to display an acronym starting at a block 300. Scanning forward and then backward in the text document, looking for the acronym expansion is performed as indicated in a block 302. Checking whether acronym expansion is found is performed as indicated in a decision block 304. When the acronym expansion is found, then the sequential steps continue following entry point F in FIG. 3B. When the acronym expansion is not found, then the routine display dictionary is called as indicated in a block 306. Checking whether acronym expansion in the dictionary is found is performed as indicated in a decision block 308. When the acronym expansion is found in the dictionary, then the sequential steps continue following entry point F in FIG. 3B. When the acronym expansion is not found in the dictionary, then the sequential steps return as indicated in a block 310.

Figure 3B:
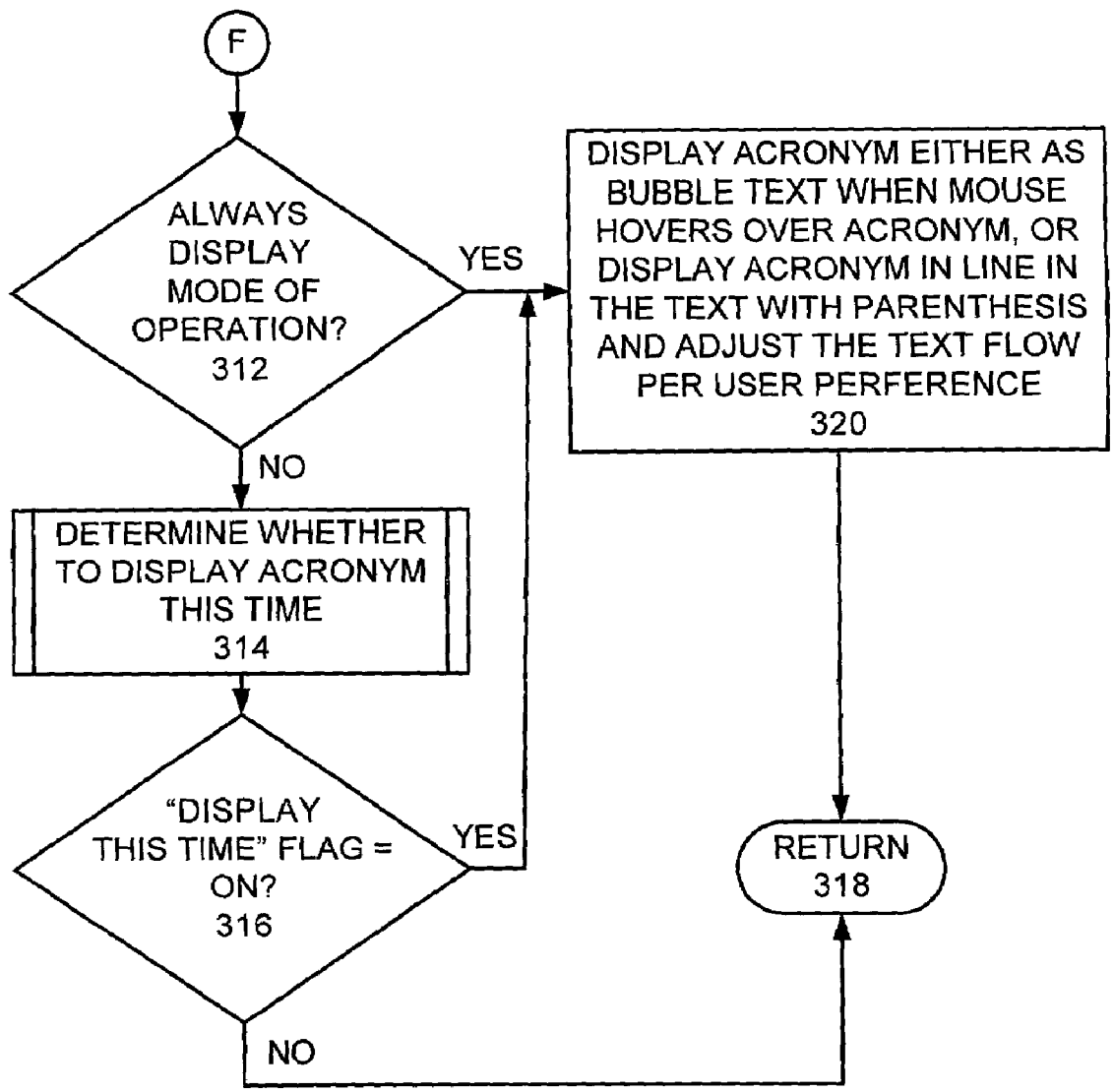

Referring to FIG. 3B, checking for an always display mode of operation is performed as indicated in a decision block 312. When the always display mode of operation is not found, a routine to determine whether to display the acronym this time is performed as indicated in a block 314. The routine to determine whether to display the acronym this time is illustrated and described with respect to FIG. 4. Checking whether a display this time flag is on is performed as indicated in a decision block 316. When the display this time flag is not on, then the sequential steps return as indicated in a block 318. When the always display mode of operation is found or the display this time flag is on, then the acronym is displayed per the user preference either as bubble text when the mouse hovers over the acronym, or the acronym is displayed in line in the text with parenthesis and the text flow is adjusted. Then the sequential steps return at block 318.

Figure 4:
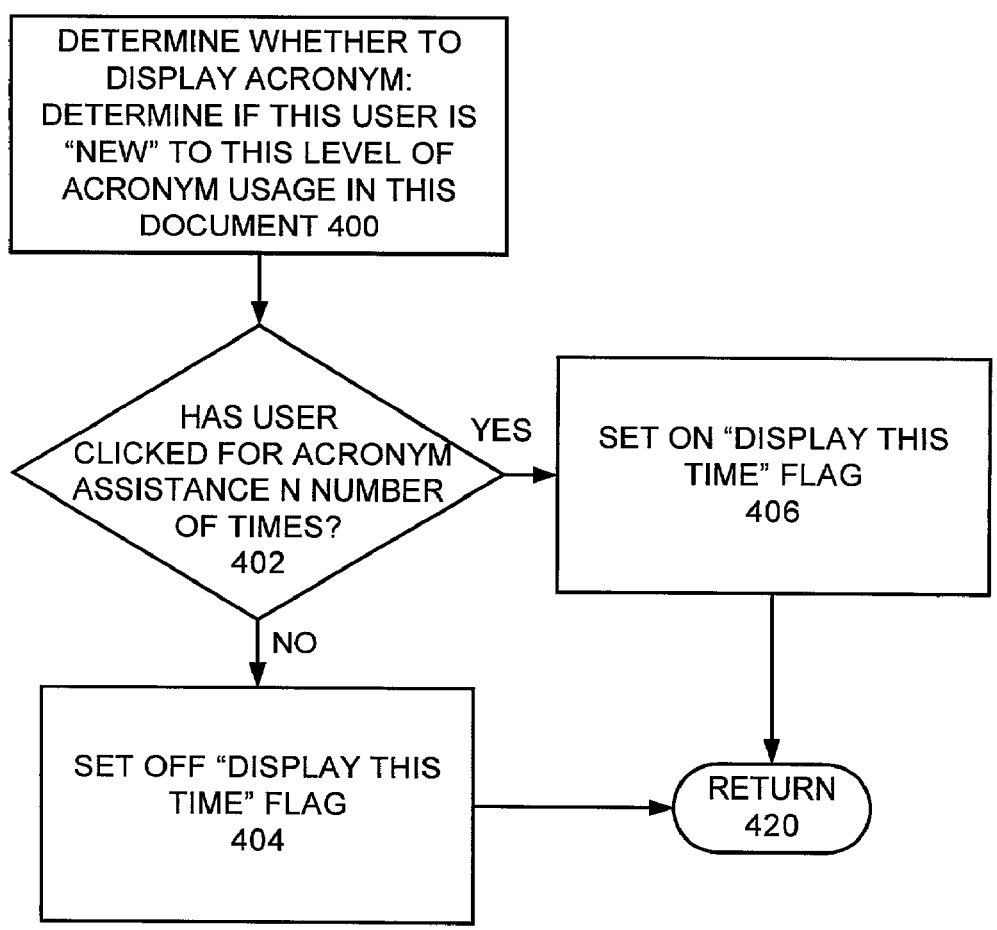

Referring to FIG. 4, there are shown exemplary sequential steps to determine whether to display the acronym this time. Checking whether the user has clicked for acronym existence a threshold N number of times is performed as indicated in a decision block 402. If the user has not clicked for acronym existence a threshold N number of times, then the display this time flag is set OFF as indicated in a block 404. If the user has clicked for acronym existence a threshold N number of times, then the display this time flag is set ON as indicated in a block 406. Then the sequential steps return at block 420.

Referring to FIG. 5 that is called at block 212 in FIG. 2A and at block 306 in FIG. 3A, there are shown exemplary sequential steps to display dictionary starting at a block 500. As indicated in a block 502, finding the acronym in an acronym dictionary 504 is performed. The acronym dictionary 504 may be a local acronym dictionary file 138 or another remote acronym dictionary, such as on the web or the like. Checking whether the acronym is found in the acronym dictionary is performed as indicated in a decision block 506. When the acronym is found in the acronym dictionary, then found in dictionary is set to yes as indicated in a block 508. The dictionary information for this acronym is saved as indicated in a block 510. When the acronym is not found in the acronym dictionary, then found in dictionary is set to no as indicated in a block 512. Then the sequential steps return as indicated in a block 514.

Referring to FIGS. 6A, 6B, 6C, 6D, 6E and 6F, there are shown exemplary sequential steps for implementing acronym assistance composition help for the writer or author by the acronym assistance program 134. The acronym assistance program 134 operates with the text program 132 being used by the writer and finds an acronym while the writer is writing or composing a document as indicated in a block 602. Finding an acronym at block 602 can be automatic when the author uses the text program 132 or can be provided upon a user action, such as clicking acronym check with the acronym highlighted. Checking whether the identified acronym is previously defined in the document is performed as indicated in a decision block 604. When the identified acronym is not previously defined in the document, checking whether the acronym is defined later in the document is performed as indicated in a decision block 606. When the acronym is defined later in the document, a flag is set to indicate that the acronym is expanded later and the later position of the acronym expansion is saved as indicated in a block 608. Then the sequential steps continue following entry point J in FIG. 6C.

When the identified acronym is previously defined in the document, checking whether the acronym is far away from the current position in the document is performed as indicated in a decision block 610. A threshold number of pages away or chapters away is used at decision block 610 to determine when the acronym is far away. When the acronym is far away from the current position in the document, the author is notified, for example, that this is a good place to expand this acronym and a flag to expand is set as indicated in a block 612. Then the sequential steps continue following entry point H in FIG. 6B. When the acronym is not far away from the current position in the document, then checking whether there is extra space on this page or paragraph that will not cause extra wrapping or extra pages is performed as indicated in a decision block 614. When there is no extra space on this page or paragraph, then the sequential steps continue following entry point J in FIG. 6C. Otherwise, when there is extra space on this page or paragraph that will not cause extra wrapping or extra pages, then the author is notified that this is a good place to expand this acronym and a flag to expand is set at block 612. Then the sequential steps continue following entry point H in FIG. 6B.

Figure 6A:
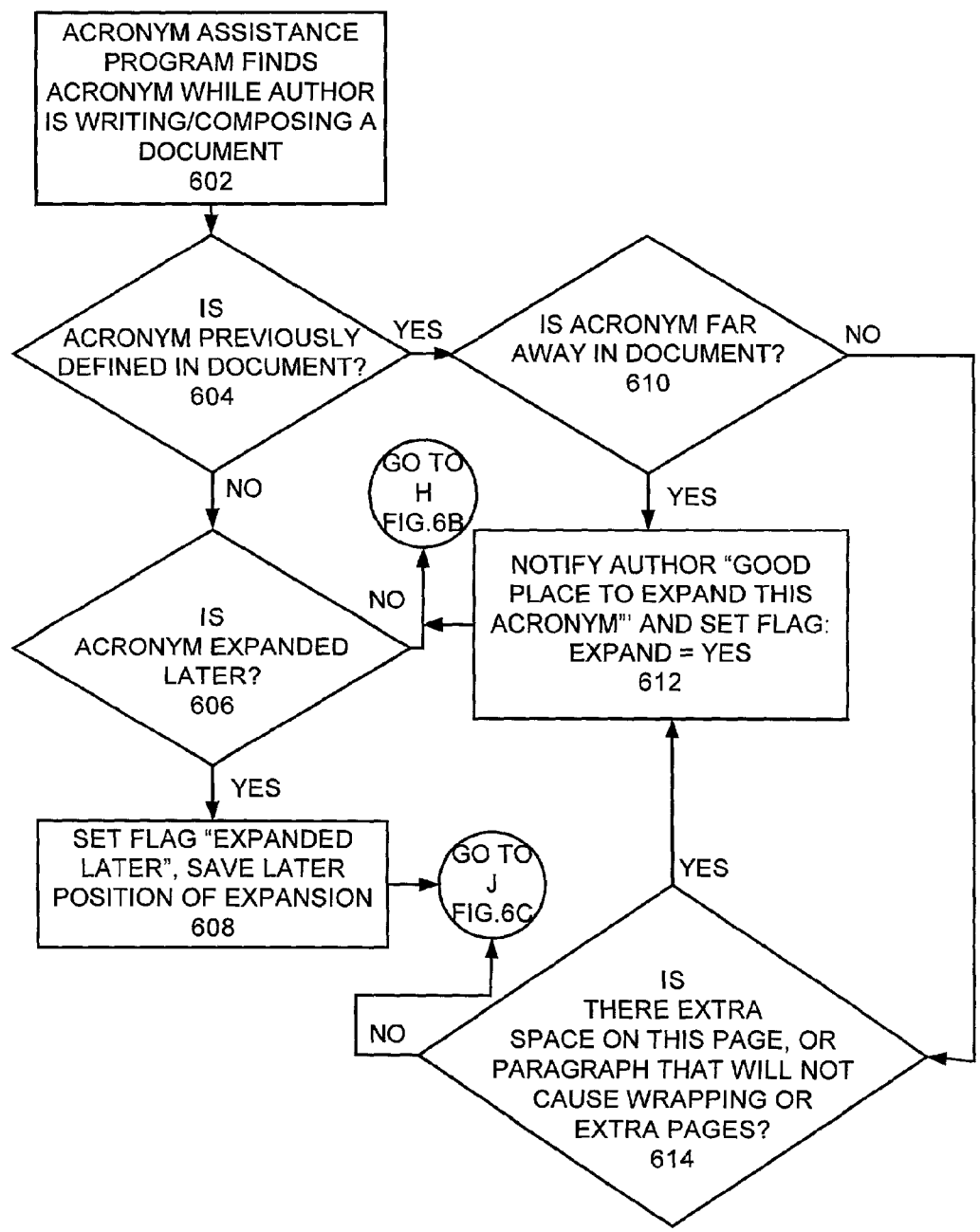
Figure 6B:
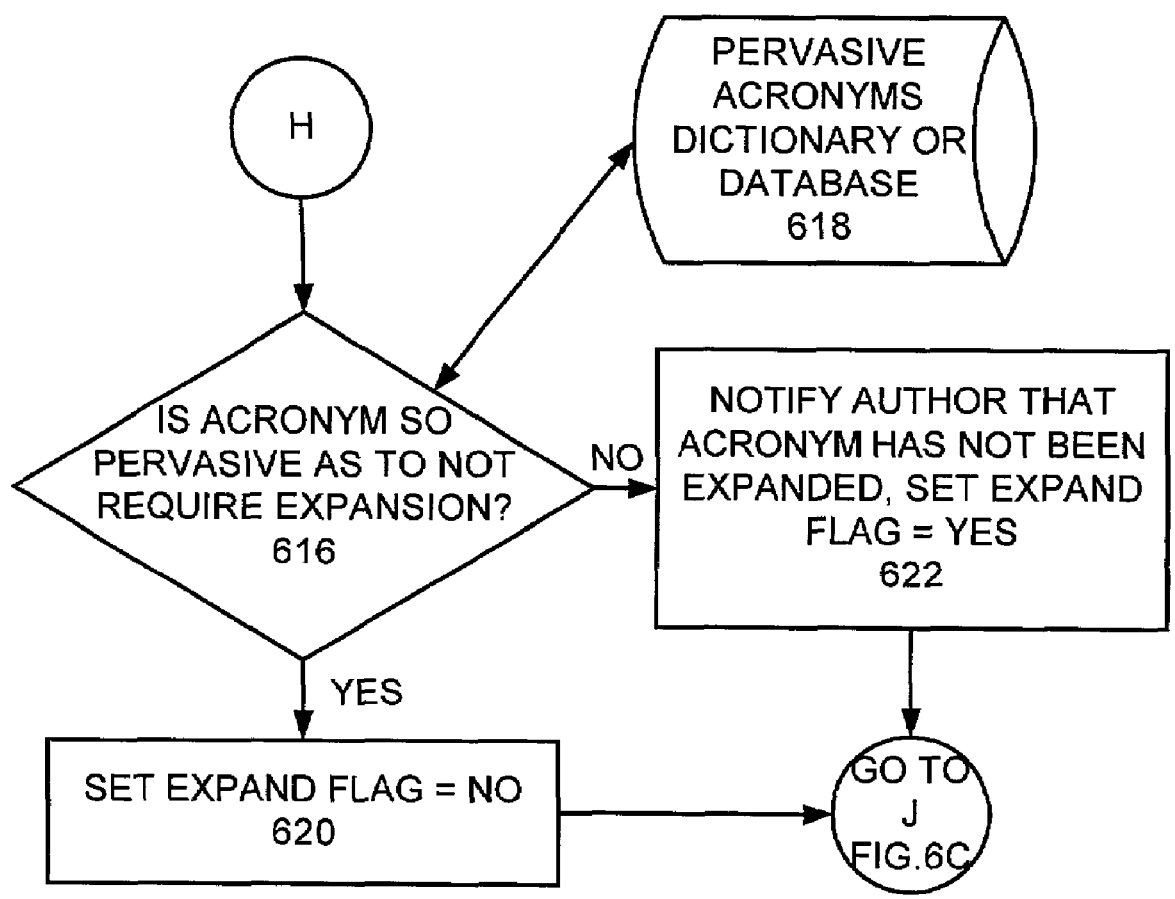

Referring now to FIG. 6B following entry point H, checking whether the acronym is so pervasive as to not require expansion, such as, the acronym IBM, is performed as indicated in a decision block 616 using a pervasive acronym dictionary or database 618. If the acronym is so pervasive as to not require expansion, then the expand flag is set to no as indicated in a block 620. If the acronym is not so pervasive as to not require expansion, then the author is notified that acronym has not been expanded and the expand flag is set to yes as indicated in a block 622. Then the sequential steps continue following entry point J in FIG. 6C.

Referring now to FIG. 6C following entry point J, checking whether the acronym is to be expanded is performed as indicated in a decision block 624. For example, if the expand flag is set to no, then the sequential steps exit and normal edit functions are continued as indicated in a block 626. If the acronym is to be expanded, such as when the expand flag is set to yes, then checking defaults set for author to be prompted is performed as indicated in a decision block 628. If the defaults are not set for author to be prompted, then the sequential steps continue following entry point K in FIG. 6D. Otherwise if the defaults are set for author to be prompted, then a message to the author is identified based on the gathered data as indicated in a block 630. For a case 1, the message to be displayed is that the acronym has not been expanded. For a case 2, the message to be displayed is that the acronym has been expanded, but not for a long distance. For a case 3, the message to be displayed is that the acronym has been expanded later but not earlier. Checking for the case 1 is performed as indicated in a decision block 632. When case 1 is not identified, checking for the case 2 is performed as indicated in a decision block 633. When case 2 is identified, then the sequential steps continue following entry point L in FIG. 6E. When case 2 is not identified for the case 3, then the sequential steps continue following entry point M in FIG. 6F. When case 1 is identified, then a message to the author is displayed; such as, "acronym not expanded anywhere, you may type the expansion or you may consult an acronym dictionary," as indicated in a block 634. Then the sequential steps continue following entry point K in FIG. 6D.

Figure 6D:
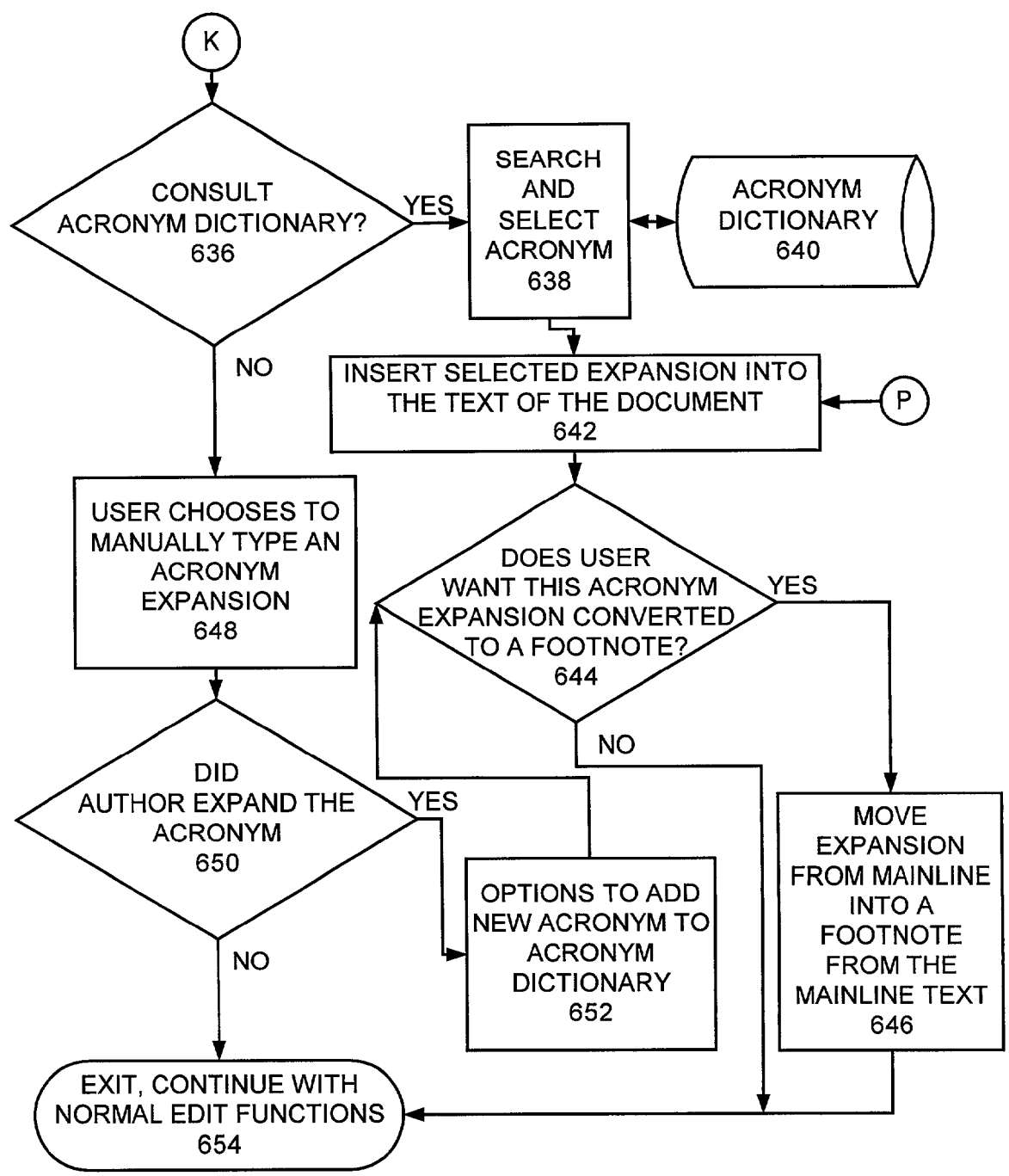

Referring now to FIG. 6D following entry point K, checking whether to consult the acronym dictionary is performed as indicated in a decision block 636. When the acronym dictionary is to be consulted, then as indicated in a block 638 searching and selecting the acronym from a local or web-based acronym dictionary 640 is performed. Then the selected acronym expansion is inserted into the text of the document as indicated in a block 642. Checking whether the user wants this acronym expansion converted into a footnote is performed as indicated in a decision block 644. Then the acronym expansion is moved from the text mainline into a footnote and a reference to the footnote is provided in the mainline text as indicated in a block 646. When the acronym dictionary is not to be consulted, then as indicated in a block 648 the user may choose to type an acronym expansion manually. Checking whether the user expanded the acronym is performed as indicated in a decision block 650. If the user expanded the acronym, then options to add the new acronym to the acronym dictionary are provided as indicated in a block 652. Next checking whether the user wants this acronym expansion converted into a footnote is performed at decision block 644. If the user did not expand the acronym or after the acronym expansion is moved from the text mainline into a footnote and a reference to the footnote is provided in the mainline text at block 646 then the sequential steps exit and normal edit functions are continued as indicated in a block 654.

Referring now to FIG. 6E following entry point L after case 2 is identified when the acronym has been expanded, but not for a long distance, checking whether the form of the previously expanded acronym is ABC (A-B-C-) and author preference for this acronym form is to only expand once, so that subsequent expansions are not necessary as indicated in a decision block 656. If so, then the sequential steps exit and normal edit functions are continued as indicated in a block 658. Otherwise, checking whether the author wants to expand this acronym again, such as for easier reading, is performed as indicated in a decision block 660. When the author wants to expand this acronym again, the expansion for the acronym is retrieved from its prior location as indicated in a block 662. Then the sequential steps return to block 642 in FIG. 6D following entry point P. When the author does not want to expand this acronym again, then checking whether the author wants to refer to the previous acronym expansion is performed as indicated in a decision block 664. If so, a reference to the previous expansion of the acronym is inserted as indicated in a block 668. For example, a hypertext link, a footnote to reference with a page number, or an in-line reference such as, "see page number xyz for acronym definition" is inserted at block 668. Then the sequential steps exit and normal edit functions are continued as indicated in a block 658.

Figure 6F:
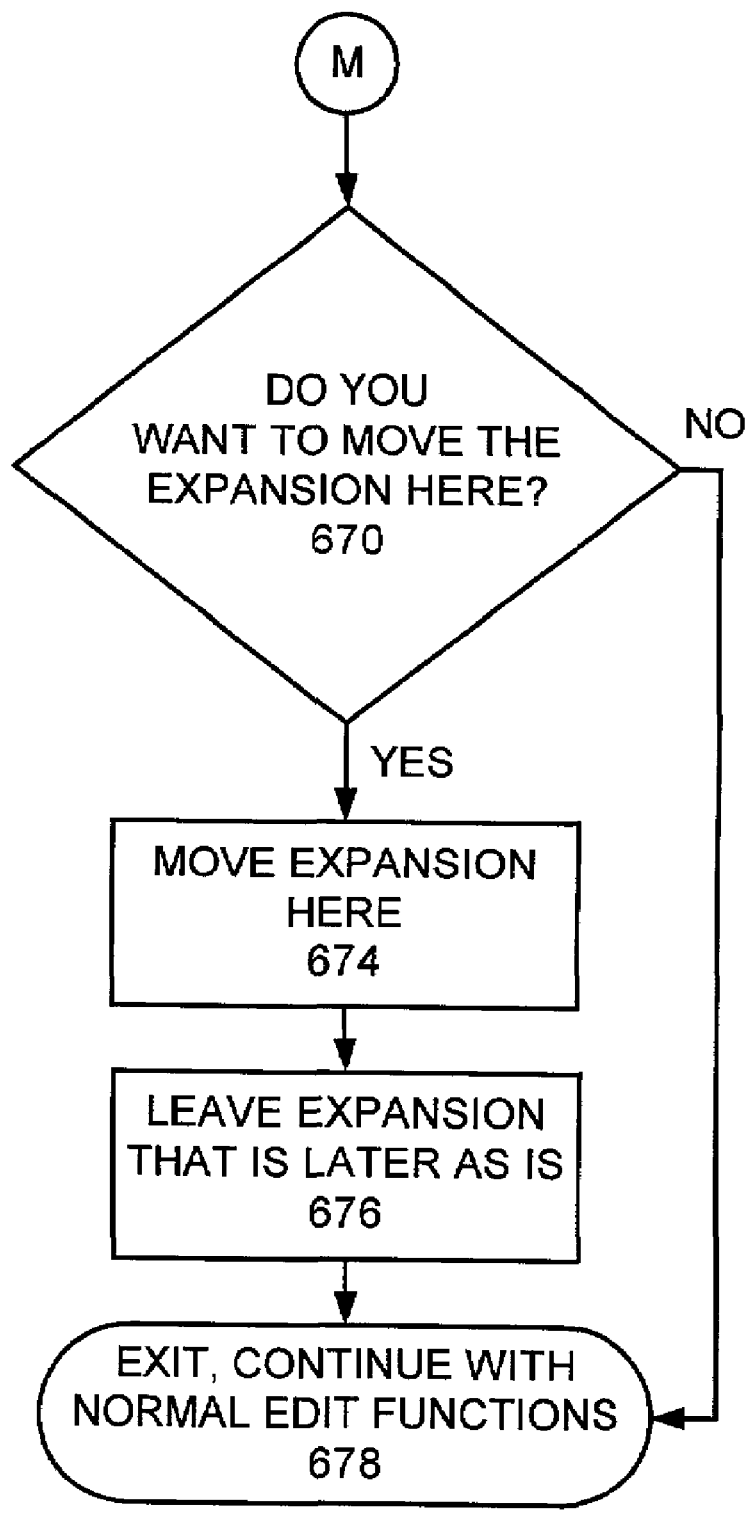

Referring now to FIG. 6F following entry point M after case 3 is identified when the acronym has been expanded later, but not earlier, then checking whether the author wants the acronym expansion moved to the current location is performed as indicated in a decision block 670. If so, then the acronym expansion is moved to the current location as indicated in a block 674. The acronym expansion that is later is left as is as indicated in a block 676. The sequential steps exit and normal edit functions are continued as indicated in a block 678.

Figure 7:
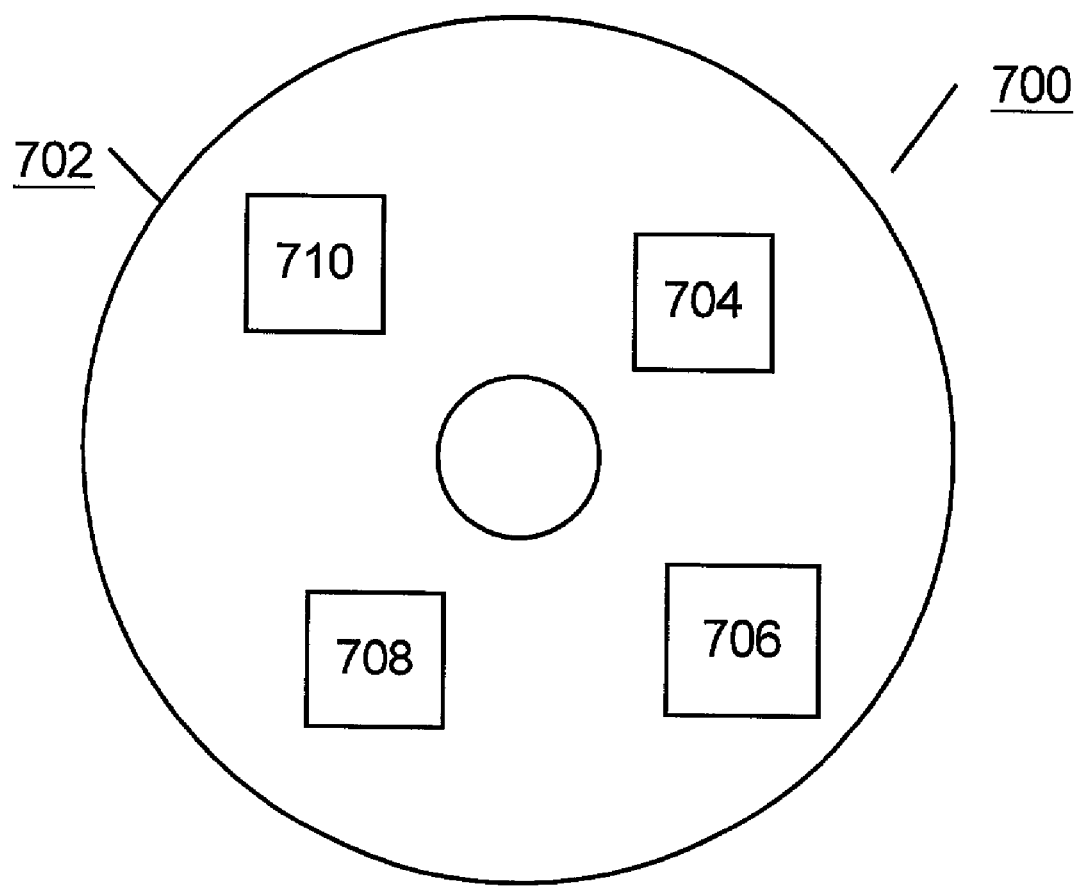
FIG. 7 is a block diagram illustrating a computer program product in accordance with the preferred embodiment.

Referring now to FIG. 7, an article of manufacture or a computer program product 700 of the invention is illustrated. The computer program product 700 includes a recording medium 702, such as, a floppy disk, a high capacity read only memory in the form of an optically read compact disk or CD-ROM, a tape, a transmission type media such as a digital or analog communications link, or a similar computer program product. Recording medium 702 stores program means 704, 706, 708, and 710 on the medium 702 for carrying out the methods for implementing acronym assistance of the preferred embodiment in the computer system 100 of FIGS. 1A and 1B.

A sequence of program instructions or a logical assembly of one or more interrelated modules defined by the recorded program means 704, 706, 708, 710, direct the computer system 100 for implementing acronym assistance of the preferred embodiment.

While the present invention has been described with reference to the details of the embodiments of the invention shown in the drawing, these details are not intended to limit the scope of the invention as claimed in the appended claims.

What is claimed is:

1. A method for implementing acronym assistance for a user of a text program comprising the steps of:
   identifying an acronym in a text document;
   scanning said text document to identify a definition of said acronym including the step of scanning said text document within a predefined number of words of said acronym to identify a definition of said acronym; and
   responsive to identifying said definition of said acronym, displaying said definition of said acronym to the user including the steps of automatically determining a number of times a user has clicked for acronym assistance and displaying said definition of said acronym to the user responsive to said number exceeding a set threshold value.

2. A method for implementing acronym assistance for a user of a text program as recited in claim 1 includes the step of using an acronym dictionary to identify a definition of said acronym.

3. A method for implementing acronym assistance for a user of a text program as recited in claim 1 includes the step of using an acronym collection file to identify a definition of said acronym.

4. A method for implementing acronym assistance for a user of a text program as recited in claim 1 includes the step of providing prompts for a reader and a writer using the text program.

5. A method for implementing acronym assistance for a user of a text program as recited in claim 1 includes the step of providing user selected options for displaying the definition of the acronym to the user.

6. A method for implementing acronym assistance for a user of a text program as recited in claim 1 includes the step of displaying options for the user to access an acronym dictionary.

7. A method for implementing acronym assistance for a user of a text program as recited in claim 1 includes the step of providing said definition of said acronym in-line in the document text for a writer using the text program.

8. A method for implementing acronym assistance for a user of a text program as recited in claim 1 includes the step of providing said definition of said acronym in-line in a footnote for a writer using the text program.

9. A method for implementing acronym assistance for a user of a text program as recited in claim 1 wherein the step of scanning said text document to identify a definition of said acronym includes the step of scanning for a predefined tag format.

10. A method for implementing acronym assistance for a user of a text program as recited in claim 9 includes the step of identifying said predefined tag format for explicitly identifying said acronym.

11. A method for implementing acronym assistance for a user of a text program as recited in claim 9 includes the step of utilizing said predefined tag format for locating Universal Resource Locators (URLs) for scanning to identify said definition of said acronym.

12. A method for implementing acronym assistance for a user of a text program as recited in claim 1 wherein the step responsive to identifying said definition of said acronym, of displaying said definition of said acronym to the user includes the step of displaying said definition of said acronym to the user in bubble text.

13. A method for implementing acronym assistance for a user of a text program as recited in claim 1 wherein the step responsive to identifying said definition of said acronym, of displaying said definition of said acronym to the user includes the step of displaying said definition of said acronym to the user in-line in the text document.

14. A method for implementing acronym assistance for a user of a text program as recited in claim 1 wherein the step responsive to identifying said definition of said acronym, of displaying said definition of said acronym to the user includes the step of prompting the user for user selections.

15. A method for implementing acronym assistance for a user of a text program as recited in claim 1 includes the steps of providing acronym assistance to find and understand acronyms in a document for a document reader using the text program and providing acronym assistance in defining and using acronyms in a document for a document author using the text program.

16. A computer program product for implementing acronym assistance for a user of a text program, said computer program product including a plurality of computer executable instructions stored on a computer readable medium, wherein said instructions, when executed by a computer, cause the computer to perform the steps of:

identifying an acronym in a text document;

scanning said text document to identify a definition of said acronym including scanning said text document within a predefined number of words of said acronym to identify a definition of said acronym; and responsive to identifying said definition of said acronym, displaying said definition of said acronym to the user including automatically determining a number of times a user has clicked for acronym assistance and displaying said definition of said acronym to the user responsive to said number exceeding a set threshold value.

17. The computer program product for implementing acronym assistance for a user of a text program as recited in claim 16 wherein said instructions, when executed by said computer, further cause the computer to perform the steps of using one of an acronym dictionary or an acronym collection file to identify a definition of said acronym; and providing user selected options for displaying said definition of said acronym to the user.

* * * * *